(No Model.)
G. R. BUFFHAM.
VENTILATOR.
No. 349,782. Patented Sept. 28, 1886.
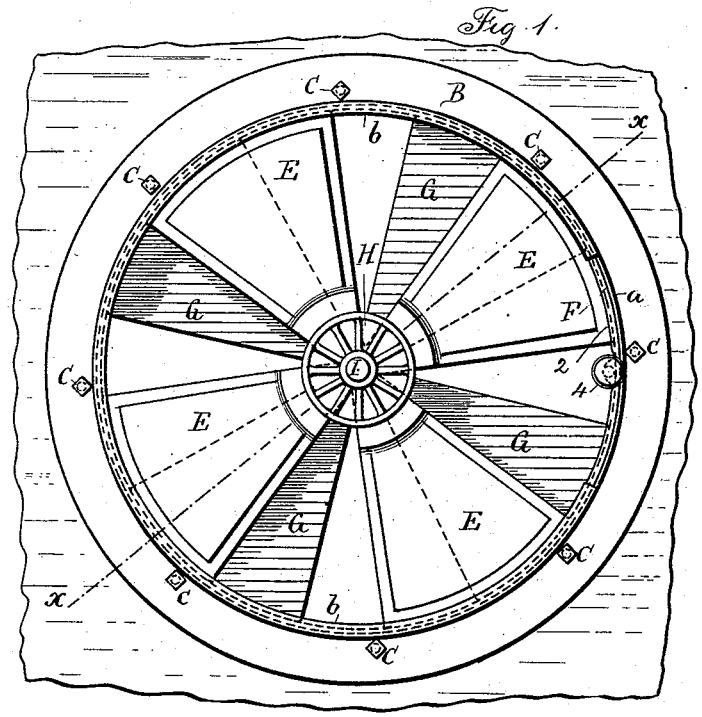
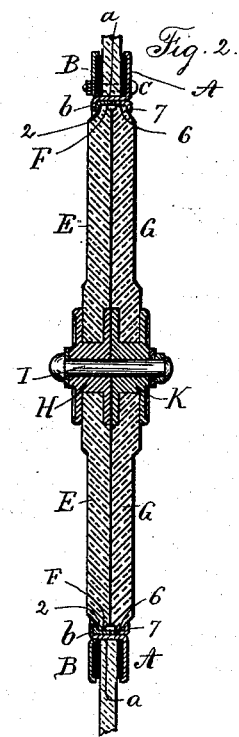
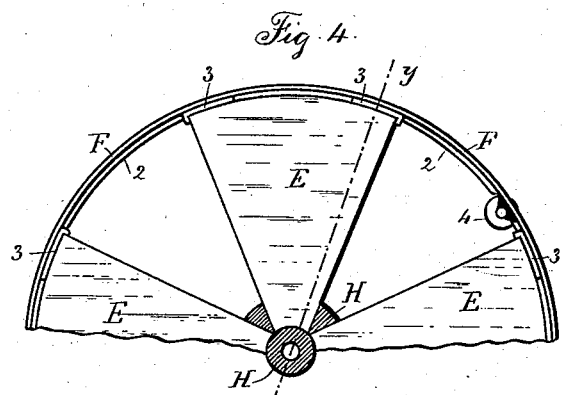
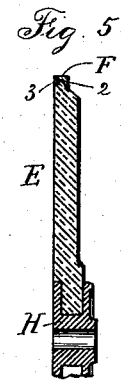
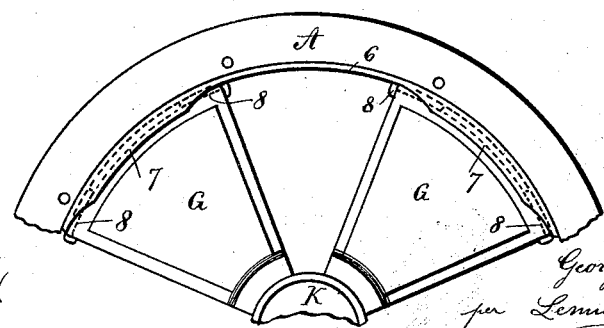
Witnesses:
J. Staib
Chos H. Smith
Inventor:
George R. Buffham
per Lemuel W. Serrell, atty.

UNITED STATES PATENT OFFICE.

GEORGE R. BUFFHAM, OF PORT CHESTER, NEW YORK.

VENTILATOR.

SPECIFICATION forming part of Letters Patent No. 349,782, dated September 28, 1886.

Application filed February 1, 1886. Serial No. 190,403. (No model.)

*To all whom it may concern:*

Be it known that I, GEORGE R. BUFFHAM, of Port Chester, in the county of Westchester and State of New York, have invented an Improvement in Window-Ventilators, of which the following is a specification.

Letters Patent Nos. 205,999 and 215,791 have been granted to me for improvement in ventilators, in which glass is made use of for the plates that rest one against the other, and such glass was perforated to form the ventilating-openings.

My present invention is for lessening the cost of manufacture, for allowing different colors of glass to be used, for strengthening the ventilator itself, and for lessening the risk of injury to the pane of glass into which the ventilator is inserted.

In the drawings, Figure 1 is an elevation of the ventilator complete. Fig. 2 is a section of the same at the line $x$ $x$. Fig. 3 is a separate view of a part of one side of the stationary ring. Fig. 4 is a similar view of the moving ring, and Fig. 5 is a section at the line $y$ $y$ of Fig. 4.

I make use of two rings, by which the ventilator is secured into the opening cut in the pane of window-glass, or other place where the ventilator is made use of. The ring A is made with an internal rim, $a$, and an inward flange, $b$, and the ring B is of a size to surround the rim $a$, and there are screws or bolts C, by which the rings are clamped upon opposite sides of the pane of glass or other support, and rings of india-rubber or other soft material are introduced between the rings A and B and the surfaces of the glass, to make the joints water-tight and to effectually prevent the ring turning. The ventilator is made of sections of glass with intermediate openings. These sections may be either cut out or pressed into shape, preferably the latter, and said sections of glass are ornamented to a greater or less extent, if desired, and it is preferable to make use of colored glass in one of the wheels and plain or frosted glass in the other. The sections E, of glass, are connected together at or near the middle, and at their outer edges they are received into and supported by the rim F, that is of a size to pass freely into the rim $a$, and to be turned therein. This rim F has an inward flange, 2, on one edge to support the outer ends of the glass sections E, and there are clip-pieces 3 applied at each of the outer corners of the glass sections to hold the said glass sections into the rim F, and to prevent said sections becoming loose. These clip-pieces are preferably separate from the ring F and soldered into place; but they may be made as part of the ring, and there is a thumb-piece or knob, 4, upon the rim F, by which the same may be moved to open or close the ventilator, and the inward flange, $b$, is removed for a sufficient distance to allow for the motion of this thumb-piece 4, and to form stops in opening and closing the ventilator. The sections of glass G are received at their outer edges into a rim, 6, that is of a size to pass into the rim $a$. The flange portions 7 of the rim 6 and the clip-pieces 8 hold the outer edges of the glass sections G firmly within the rim 6; and it is now to be understood that in putting the ventilator together the rim F, with its glass sections E, is to be inserted into the internal ring, $a$, and rest upon the inward flange, $b$. After this the section of glass G and their rim 6 are to be inserted into place within the internal rim, $a$, with the surfaces of the glass sections G resting upon the surfaces of the glass sections E, and then the rim 6 is to be soldered into place, or the parts fastened by screws or pins within the internal rim, $a$, thereby holding the rim F and glass sections E in their proper positions, but allowing them to be turned in opening and closing the ventilator. In all instances the adjacent surfaces of the glass set directly against each other and the outer edges are beveled, as shown in Fig. 2, to facilitate the securing of the same into the metal frames.

The mode of construction thus described is available with any desired connection between the respective glass sections in the middle portions of the respective wheels, and the central connections can be made of either glass or metal. I have, however, represented two hub-pieces, H and K, with a central rivet, I, the respective hub-pieces being recessed for the reception of the inner ends of the glass sections, and these ends of the glass sections are secured into place by plaster-of-paris or other cement.

This ventilator may be introduced into an opening in a plate or pane of glass, or it may be connected with the lead or other frames of casement-windows. Each section of glass may be surrounded by a metal frame, if desired.

I do not claim two disks containing sections of glass, one turning on the other, as these have before been proposed; but the glasses have been of uniform thickness, and the surfaces of the glasses in the different sections did not come into contact, and consequently could not close tightly.

I claim as my invention—

1. A ventilator formed of sections of glass with intermediate openings, and two frames or rims for supporting such sections and for allowing one frame or rim, with its sections of glass, to be moved upon the other frame or rim in opening or closing the ventilator, the adjacent faces of the glass being in contact, and the outer edges of the sections being beveled where they are secured in the rims, substantially as set forth.

2. The metal ring A, having an internal rim, $a$, and flange $b$, in combination with the sections E, of glass, the rim F, for connecting such sections together, the sections G, of glass, and the rim 6, for connecting such sections together, the rim F being between the flanges $b$ and the rim 6, and the said rim 6 being permanently secured within the rim $a$, substantially as set forth.

3. The combination, in a ventilator, of sections of glass E and G, rims for supporting the same, and the inward flanges and clip-pieces for holding the outer ends of the respective sections of glass within the rims, substantially as set forth.

4. The combination, with a stationary and turning wheel in a ventilator, of the rings A and B, and the rings of rubber or similar yielding material between the same and the surface of the glass, and the screws for clamping the parts, substantially as specified.

Signed by me this 22d day of January, A. D. 1886.

GEO. R. BUFFHAM.

Witnesses:
GEO. T. PINCKNEY,
WILLIAM G. MOTT.